(12) United States Patent
Ruben et al.

(10) Patent No.: US 9,767,305 B2
(45) Date of Patent: Sep. 19, 2017

(54) SYSTEMS AND METHODS FOR SHARING MEDIA CONTENT WITH RECOGNIZED SOCIAL CONNECTIONS

(71) Applicant: Facebook, Inc., Menlo Park, CA (US)

(72) Inventors: William M. Ruben, San Franciso, CA (US); Lin He, Santa Clara, CA (US); Zachary W. Gomez, Mountain View, CA (US); Ashwin Bharambe, Sunnyvale, CA (US); Laura Javier, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/656,974

(22) Filed: Mar. 13, 2015

(65) Prior Publication Data
US 2016/0267285 A1    Sep. 15, 2016

(51) Int. Cl.
| G06F 21/00 | (2013.01) |
| G06F 21/62 | (2013.01) |
| G06K 9/00 | (2006.01) |
| G06F 21/32 | (2013.01) |
| G06T 13/80 | (2011.01) |
| G06T 19/20 | (2011.01) |
| H04N 21/00 | (2011.01) |
| H04N 21/4788 | (2011.01) |

(52) U.S. Cl.
CPC .......... *G06F 21/6218* (2013.01); *G06F 21/32* (2013.01); *G06K 9/00288* (2013.01); *G06T 13/80* (2013.01); *G06T 19/20* (2013.01); *H04N 21/00* (2013.01); *H04N 21/4788* (2013.01); *G06T 2219/2004* (2013.01)

(58) Field of Classification Search
None
See application file for complete search history.

(56) References Cited

U.S. PATENT DOCUMENTS

| 7,961,986 B1* | 6/2011 | Jing ................. G06F 17/30265 382/305 |
| 8,660,358 B1* | 2/2014 | Bergboer ........... G06K 9/00677 345/629 |
| 2002/0167546 A1* | 11/2002 | Kimbell ................ G06F 3/0483 715/790 |
| 2003/0189602 A1* | 10/2003 | Dalton .................. G06F 3/0483 715/830 |
| 2010/0287053 A1* | 11/2010 | Ganong ............ G06F 17/30247 705/14.66 |
| 2010/0310135 A1* | 12/2010 | Nagaoka ........... G06F 17/30247 382/118 |

(Continued)

OTHER PUBLICATIONS

U.S. Appl. No. 14/656,276, filed Mar. 12, 2015.

*Primary Examiner* — Maung Lwin
(74) *Attorney, Agent, or Firm* — Sheppard Mullin Richter & Hampton LLP

(57) ABSTRACT

Systems, methods, and non-transitory computer-readable media can detect a set of images locally stored on a computing system. The computing system can be associated with a first user. One or more facial recognition processes can be applied to the set of images. It can be determined, based on the one or more facial recognition processes, that a subset of images, out of the set of images, is associated with a second user. One or more options for the first user to share the subset of images with the second user can be provided.

20 Claims, 11 Drawing Sheets

(56) References Cited

U.S. PATENT DOCUMENTS

| | | | |
|---|---|---|---|
| 2011/0043643 A1* | 2/2011 | Yu | H04N 1/00209 348/207.1 |
| 2011/0064281 A1* | 3/2011 | Chan | G06Q 50/01 382/118 |
| 2011/0126155 A1* | 5/2011 | Krishnaraj | G06F 3/016 715/811 |
| 2012/0027256 A1* | 2/2012 | Kiyohara | G06F 17/30029 382/103 |
| 2012/0086792 A1* | 4/2012 | Akbarzadeh | H04N 1/00307 348/77 |
| 2012/0290950 A1* | 11/2012 | Rapaport | H04L 51/32 715/753 |
| 2013/0101181 A1* | 4/2013 | Hsi | G06K 9/00288 382/118 |
| 2013/0332512 A1* | 12/2013 | Roman | G06F 3/0481 709/203 |
| 2014/0133756 A1* | 5/2014 | Bergboer | G06K 9/00677 382/190 |
| 2014/0365581 A1* | 12/2014 | Kennon | G06Q 50/01 709/205 |
| 2015/0227782 A1* | 8/2015 | Salvador | G06K 9/00288 382/118 |
| 2016/0165160 A1* | 6/2016 | Hseih | H04N 5/363 348/308 |

\* cited by examiner

SYSTEMS AND METHODS FOR SHARING MEDIA CONTENT WITH RECOGNIZED SOCIAL CONNECTIONS

FIELD OF THE INVENTION

The present technology relates to the field of media content. More particularly, the present technology relates to techniques for sharing media content with recognized social connections.

BACKGROUND

Today, people often utilize computing devices (or systems) for a wide variety of purposes. Users can use their computing devices to, for example, interact with one another, access content, share content, and create content. In some cases, a user can utilize his or her computing device to create media content items, such as images, videos, audio, and text. In some instances, it may also be desirable for the user to share at least some of the media content items with a social connection or friend within a social networking system (or service).

Under conventional approaches, media content associated with the user, such as images or videos created by the user, are generally shared in an inefficient or cumbersome manner. For example, conventional approaches generally require manual effort to select certain media content items to be shared. In another example, conventional approaches generally rely solely on manual effort to determine with whom the selected media content items are to be shared. Accordingly, such conventional approaches to sharing media content can be inefficient and inconvenient. Due to these and other reasons, conventional approaches can create challenges for or reduce the overall user experience associated with sharing media content.

SUMMARY

Various embodiments of the present disclosure can include systems, methods, and non-transitory computer readable media configured to detect a set of images locally stored on a computing system. The computing system can be associated with a first user. One or more facial recognition processes can be applied to the set of images. It can be determined, based on the one or more facial recognition processes, that a subset of images, out of the set of images, is associated with a second user. One or more options for the first user to share the subset of images with the second user can be provided.

In an embodiment, the subset of images determined to be associated with the second user can be presented, in a virtual card stack, to the first user. The subset of images can be presented via a first virtual card that is in a topmost layer of the virtual card stack. A user command to prevent, at least temporarily, the subset of images from being shared with the second user can be received. An animation that moves the first virtual card to a bottommost layer of the virtual card stack can be provided. A second virtual card can be presented in the topmost layer of the virtual card stack. Another subset of images can be presented via the second virtual card.

In an embodiment, the virtual card stack can comprise a plurality of virtual cards including the first virtual card and the second virtual card. Each virtual card in the plurality of virtual cards can be ranked based on at least one of relevancy data, social affinity data, recognition quality data, recognition quantity data, historical data, location data, or time data. Each virtual card in the plurality of virtual cards can be associated with a respective ranking. Each virtual card in the plurality of virtual cards can be associated with a respective layer in the virtual card stack based on its respective ranking. The first virtual card can be ranked higher than the second virtual card prior to receiving the user command.

In an embodiment, a set of one or more collections of images that have been shared can be presented to the first user. The one or more collections of images can have been shared by at least one of the first user or a social connection of the first user. The one or more collections can be presented via at least one of a feed view or a gallery view.

In an embodiment, the subset of images determined to be associated with the second user can be presented, in a virtual card stack, to the first user. The subset of images can be presented via a first virtual card that is in a topmost layer of the virtual card stack. A user command that causes the subset of images to be shared with the second user can be received. An animation that moves the first virtual card into the set of one or more collections of images can be provided. The animation can cause the first virtual card to become a first collection of images in the set. A second virtual card can be presented in the topmost layer in the virtual card stack. Another subset of images can be presented via the second virtual card.

In an embodiment, the one or more collections, presented via the at least one of the feed view or the gallery view, can be sorted chronologically based on time data indicating when each of the one or more collections was shared.

In an embodiment, the user command can be received from the first user. The subset of images can be stored privately and locally prior to receiving the user command that causes the subset of images to be shared with the second user.

In an embodiment, at least one of the subset of images or a particular collection of images in the set can be generated based on at least one of user facial recognition, event recognition, event detection, recency, reciprocity, user clustering, location similarity, or topic similarity.

In an embodiment, it can be determined, based on one or more user clustering processes, that another subset of images, out of the set of images, is associated with a third user. An identity of the third user can yet to be determined. Information indicating the identity of the third user can be received at a subsequent time. The other subset of images can be associated with the third user.

In an embodiment, it can be determined that information associated with a face template of the second user is permitted to be transmitted to the computing system. The face template of the second user can be received. The one or more facial recognition processes can utilize, at least in part, the face template associated with the second user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
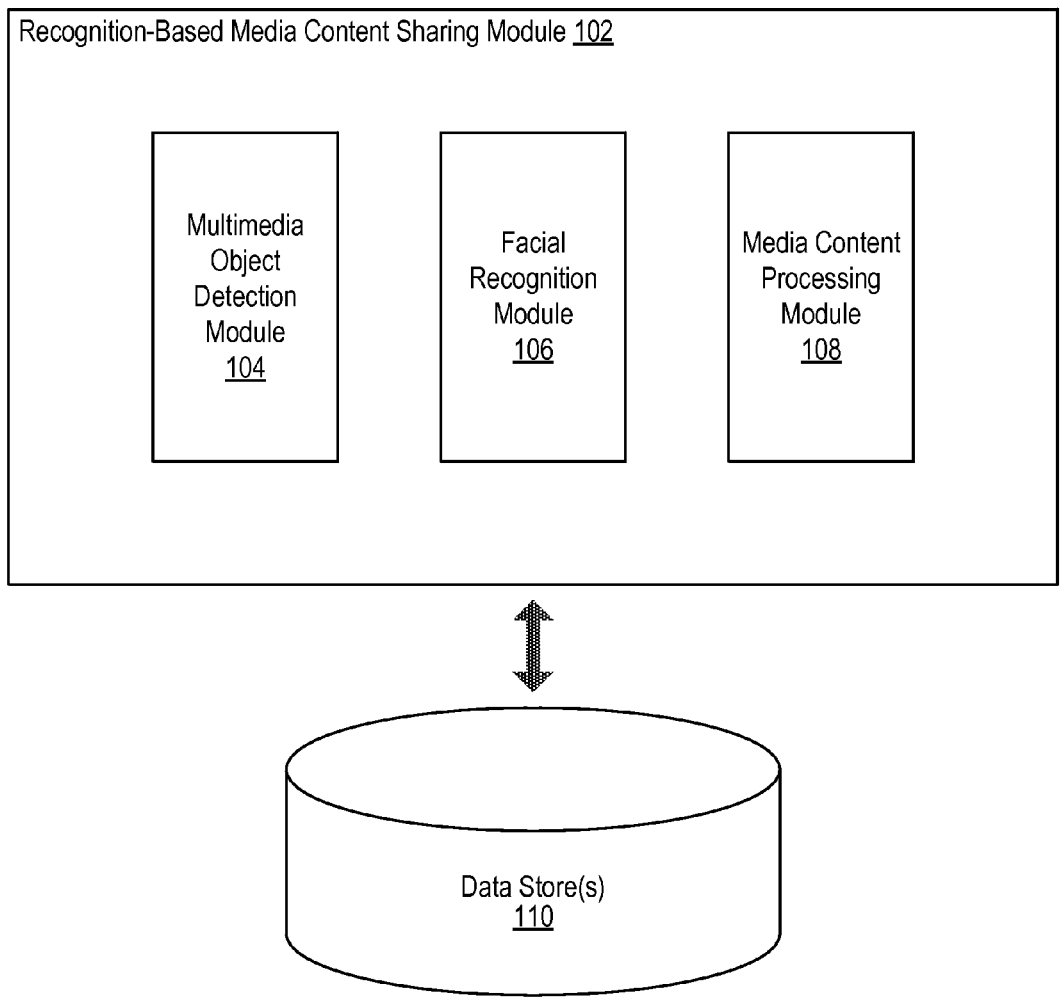
FIG. 1 illustrates an example system including an example recognition-based media content sharing module configured to facilitate sharing media content with recognized social connections, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Sharing Media Content with Recognized Social Connections

People use computing devices (or systems) for a wide variety of purposes. Computing devices can provide different kinds of functionality. Users can utilize their computing devices to produce information, access information, and share information. In some cases, users can use their computing devices to generate or produce media content items, such as by taking pictures, recording videos, recording audio clips, etc. In some instances, users can use their computing devices to receive media content items, such as by downloading and/or saving pictures, videos, audio clips, etc. In some cases, users can decide to share at least some of these or other media content items with one or more of the users' social connections or friends within social networking systems (or services).

Conventional approaches to sharing media content generally require a significant amount of steps or actions to be taken in order for media content to be shared among users. Also, under conventional approaches to sharing media content, a significant amount of manual effort may be required to facilitate the sharing of media content. In some instances, conventional approaches may require a user to exert manual effort to select the media content to be shared. In some cases, in accordance with conventional approaches, the user has to exert effort in considering and deciding with which social connections the selected media content is to be shared. As such, these and other concerns associated with conventional approaches can cause media content sharing to be inefficient, troublesome, and cumbersome.

Therefore, an improved approach to sharing media content can be beneficial for addressing or alleviating various concerns associated with conventional approaches. The disclosed technology enables the sharing of media content with recognized social connections. Various embodiments of the present disclosure can detect a set of images locally stored on a computing system. The computing system can be associated with a first user. One or more facial recognition processes can be applied to the set of images. It can be determined, based on (i.e., based at least in part on) the one or more facial recognition processes, that a subset of images, out of the set of images, is associated with a second user. One or more options for the first user to share the subset of images with the second user can be provided. It is contemplated that there can be many variations and/or other possibilities.

FIG. 1 illustrates an example system 100 including an example recognition-based media content sharing module 102 configured to facilitate sharing media content with recognized social connections, according to an embodiment of the present disclosure. As shown in the example of FIG. 1, the recognition-based media content sharing module 102 can include a multimedia object detection module 104, a facial recognition module 106, and a media content processing module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the recognition-based media content sharing module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the recognition-based media content sharing module 102 can be implemented, in part or in whole, as software running on one or more computing devices or systems, such as on a user or client computing device. For example, the recognition-based media content sharing module 102 or at least a portion thereof can be implemented as or within an application (e.g., app), a program, or an applet, etc., running on a user computing device or a client computing system, such as the user device 710 of FIG. 7. In another example, the recognition-based media content sharing module 102 or at least a portion thereof can be implemented using one or more computing devices or systems that include one or more servers, such as network servers or cloud servers. In some instances, the recognition-based media content sharing module 102 can, in part or in whole, be implemented within or configured to operate in conjunction with a social networking system (or service), such as the social networking system 730 of FIG. 7. It should be understood that there can be many variations or other possibilities.

The multimedia object detection module 104 can be configured to facilitate detecting a set of one or more multimedia objects, such as one or more images (e.g., photos, pictures, video still frames, animated images, etc.), videos (a plurality of video still frames with or without audio), audio clips, text characters, or other media content items, locally stored on a computing system (or device). The computing system can be associated with a first user. In some cases, the computing system can correspond to the first user's smartphone, tablet, or phablet, etc. In one example, the computing system can correspond to the user device 710 of FIG. 7, which can be used by the first user.

In some implementations, the multimedia object detection module 104 can facilitate detecting the set of images at one or more specified times. In some cases, the multimedia object detection module 104 can, during an initialization process, detect a set of all images locally stored on the computing system associated with the first user. For instance, during an initial configuration of the recognition-based media content sharing module 102, the multimedia object detection module 104 can detect all images of a local camera roll of the computing system associated with the first user. Moreover, in some instances, the multimedia object detection module 104 can detect a set of new images captured, acquired, and/or stored on the computing system, such as new images that were not available at a particular previous point in time. In one example, the recognition-based media content sharing module 102 can be implemented within or utilized by an application and the multimedia object detection module 104 can facilitate detecting the set of images when the application is opened or run. As such, in this example, when the application is opened or run, the multimedia object detection module 104 can detect any new images that were acquired after the application was previously closed.

In some embodiments, the multimedia object detection module 104 can detect the set of one or more images in (or near) real-time. For example, when the first user takes, downloads, or otherwise acquires a new image, the multimedia object detection module 104 can detect the new image within an allowable time deviation from when the new image was taken, downloaded, acquired, etc. It should be appreciated that many variations are possible.

The facial recognition module 106 can be configured to facilitate applying one or more facial recognition processes to the set of images. The facial recognition module 106 can also be configured to facilitate determining, based on the one or more facial recognition processes, that a subset of images, out of the set of images, is associated with a second user. More details regarding the facial recognition module 106 will be provided below with reference to FIG. 2A.

Moreover, the media content processing module 108 can be configured to facilitate providing one or more options (e.g., suggestions) for the first user to share the subset of images with the second user. For example, the subset of images (or access thereto) can be shared with, transferred to, synchronized with, and/or provided to, etc., the second user by the first user. In some embodiments, the subset of images can include all images depicting the second user that are stored at the computing system associated with the first user. In some embodiments, images that are acquired, captured, or taken within an allowable deviation from a particular point in time and/or from a particular location can be added to the subset and/or can be included in another subset of images shareable with the second user. The media content processing module 108 will be discussed in more detail with reference to FIG. 2B.

Furthermore, in some embodiments, the recognition-based media content sharing module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the recognition-based media content sharing module 102. For instance, the at least one data store 110 can store information about images as well as information useful for facial recognition. It is contemplated that there can be many variations or other possibilities.

Figure 2A:
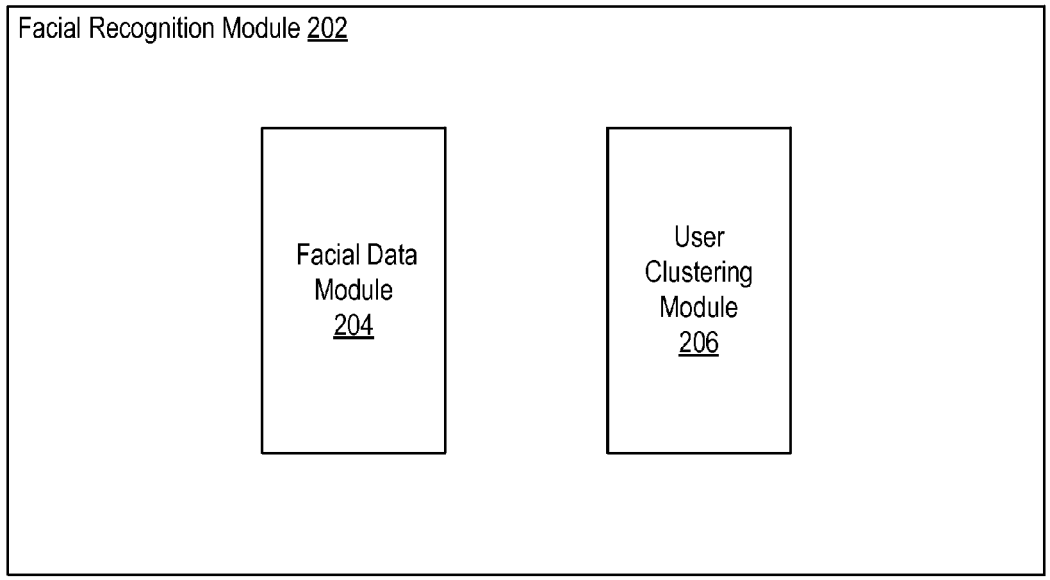
FIG. 2A illustrates an example facial recognition module configured to facilitate sharing media content with recognized social connections, according to an embodiment of the present disclosure.

FIG. 2A illustrates an example facial recognition module 202 configured to facilitate sharing media content with recognized social connections, according to an embodiment of the present disclosure. In some embodiments, the facial recognition module 106 of FIG. 1 can be implemented as the example facial recognition module 202. As shown in FIG. 2A, the facial recognition module 202 can include a facial data module 204 and a user clustering module 206.

As discussed previously, the facial recognition module 202 can be configured to facilitate applying one or more facial recognition processes to a set of images and to facilitate determining, based on the one or more facial recognition processes, that a subset of images, out of the set of images, is associated with a second user. In some instances, people's faces can be associated with particular traits, attributes, features, or properties, etc. In some cases, users of a social networking system or service (e.g., social networking system 730 of FIG. 7) can upload and store, at the social networking system, one or more images that include the users' faces or at least portions thereof. In accordance with privacy and/or permission settings associated with the users, the social networking system can analyze the users' images to determine which traits, attributes, features, or properties, etc., are associated with each user. For example, image analysis performed by the social networking system can utilize, at least in part, one or more tags, identifiers, and/or labels for each image to determine which traits, attributes, features, or properties, etc., are particular to and/or unique to each user. Facial data for each user can include, but is not limited to, such traits, attributes, features, or properties, etc., that are associated with and/or particular to each user, who can be tagged, identified, and/or labeled in the images.

Moreover, the facial data for each user can be utilized, at least in part, to generate or develop a face template (i.e., face model, facial representation, facial pattern, etc.) for each user. The face template can change over time, such as based on (e.g., based at least in part on) new facial data acquired from new images over time. In some cases, the facial data module 204 can generate or develop the face template for the second user based on the facial data associated with the second user. In some instances, the social networking system can generate or develop the face template for the second user and the facial data module 204 can acquire the second user's face template.

In some implementations, the facial data module 204 can be configured to determine that facial data or other information associated with the face template of the second user is permitted to be transmitted to the computing system associated with the first user. The facial data module 204 can be configured to receive and store such facial data or the face template of the second user, as long as the second user's privacy or permission settings so allow. In one example, the second user and the first user are friends or social connections within the social networking system. In this example, the second user's privacy or permission settings can allow the facial data module 204 (and/or the facial recognition module 202) to permissibly acquire, privately store, and/or otherwise appropriately utilize facial data associated with the second user. The first user's privacy or permission settings can likewise allow a computing system of the second user to appropriately utilize the first user's facial data. In another example, the second user is a contact of the first user, such as when the second user is associated with a particular entry in an address book or a contacts list stored at the first user's computing system. In this example, the second user's privacy or permission settings can also allow the facial data module 204 (and/or the facial recognition module 202) to appropriately utilize the second user's facial data. In some implementations, the one or more facial recognition processes applied by the facial recognition module 202 can utilize, at least in part, the face template associated with the second user, such as to facilitate determining that the subset of images is associated with the second user. Many variations are possible.

Additionally, in some embodiments, the user clustering module 206 can be configured to facilitate applying one or more user clustering processes (i.e., people clustering processes) on a set of images. The user clustering module 206 can utilize, at least in part, the one or more user clustering processes to facilitate determining that another subset of images, out of the set of images, is associated with a third user, even if an identity of the third user is yet to be determined. For example, the one or more user clustering processes can determine or identify the other subset of images to include images with faces (or portions thereof) having certain traits, attributes, features, properties, characteristics, etc., that are likely to be associated with, belong to, or be unique to a particular entity, the third user. In this example, the third user can be unidentifiable because he or she does not have an active account with the social networking system. In some cases, information indicating the identity of the third user can be received at a subsequent time. Continuing with the previous example, the third user can at a later time activate or sign up for an account with the social networking system and thus the identity of the third user can be determined, indicated, or provided. The user clustering module 206 can then associate the other subset of images with the third user. It should be appreciated that this example and other examples herein are provided for illustrative purposes and that there can be many variations or other possibilities.

Figure 2B:
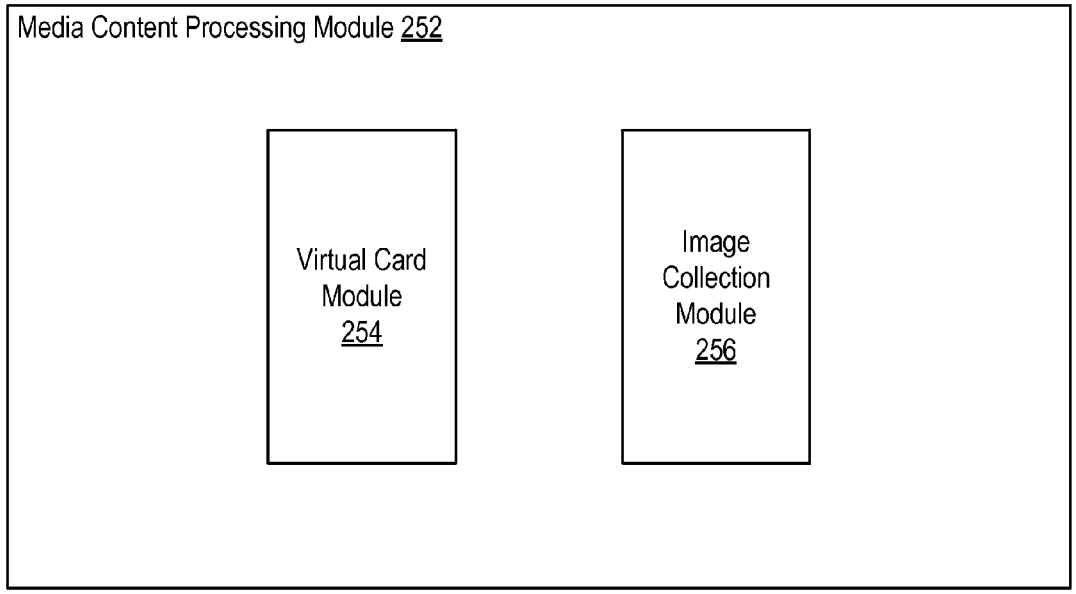
FIG. 2B illustrates an example media content processing module configured to facilitate sharing media content with recognized social connections, according to an embodiment of the present disclosure.

FIG. 2B illustrates an example media content processing module 252 configured to facilitate sharing media content with recognized social connections, according to an embodiment of the present disclosure. In some embodiments, the media content processing module 108 of FIG. 1 can be implemented as the example media content processing module 252. As shown in FIG. 2B, the media content processing module 252 can include a virtual card module 254 and an image collection module 256.

As discussed above, the media content processing module 252 can be configured to facilitate providing one or more options for a first user to share, with a second user, a subset of images determined based on one or more facial recognition processes to be associated with the second user. In some cases, the media content processing module 252 can cause a notification to be provided to the first user in (or near) real-time. The notification can, for instance, indicate that the one or more options to share the subset of images are available. For instance, a push notification suggesting to share a particular image depicting the second user can be sent to (the computing system associated with) the first user who caused the image to be acquired. The push notification can be sent within an allowable time deviation from when the image was acquired. The push notification can also be sent even when one or more processes of the recognition-based media content sharing module 102 are running in the background of the computing system of the first system.

In some cases, the subset of images can include faces or portions thereof (e.g., facial representations) that are particular to the second user. The subset or access thereto can be shared with, transferred to, synchronized with, and/or provided to, etc., the second user by the first user. In some implementations, the subset of images can be stored privately and locally, such as at a computing system of the first user, prior to receiving a user command from the first user that causes the subset of images to be shared with the second user. In some embodiments, when the subset of images is shared with the second user, the subset of images can be transmitted to, copied at, and/or stored at one or more servers remote from the computing system of the first user. The subset of images can then be made available or accessible to the second user via the one or more servers.

Moreover, in some implementations, the subset of images determined to be associated with the second user can be presented (i.e., rendered, displayed, etc.), by the virtual card module 254, in a virtual card stack to the first user. The virtual card module 254 can present, such as within an interface of an application, the subset of images via a first virtual card that is in a topmost layer of the virtual card stack. Further, in some cases, the media content processing module 252 can receive a user command to prevent, at least temporarily, the subset of images from being shared with the second user. For example, the user command to prevent the subset from being shared with the second user can be received from the first user in response to the one or more sharing options provided to the first user. The virtual card module 254 can accordingly provide an animation that moves the first virtual card to a bottommost layer of the virtual card stack. The virtual card module 254 can also present a second virtual card in the topmost layer of the virtual card stack. The second virtual card can present or represent another subset of images.

In some embodiments, the virtual card stack can comprise a plurality of virtual cards including the first virtual card and the second virtual card. Each virtual card in the plurality of virtual cards can present, include, represent, and/or be associated with a respective subset of images. Each virtual card in the plurality can be ranked based on at least one of relevancy data, social affinity data, recognition quality data, recognition quantity data, historical data, location data, or time data, etc. In one instance, each virtual card can be ranked by a metric based on the quantity of images in which users are recognized (e.g., image recognition quantity data) multiplied by a quantity of different users suggested (e.g., user recognition quantity data). As such, each virtual card in the plurality of virtual cards can be associated with a respective ranking. For example, the respective ranking for a particular virtual card can be based on how relevant its respective subset of images is relative to the first user, how socially connected the recognized users in the subset are relative to the first user, the confidence or likelihood of the recognition(s) in the subset, the number of recognitions in the subset, how the first user has previously interacted with subjects of the subset, one or more locations associated with the subset, and/or one or more times associated with the subset. It is contemplated that many variations are possible.

Additionally, each virtual card in the plurality of virtual cards can be associated with a respective layer in the virtual card stack based on its respective ranking. For instance, a virtual card having a higher ranking can be in a higher layer of the virtual card stack. Accordingly, the first virtual card can be ranked higher than the second virtual card prior to receiving the user command to prevent the sharing of the subset presented via the first virtual card. In some cases, subsequent to receiving the user command to prevent the sharing of the subset, the first virtual card can be downranked and moved to the bottommost layer of the virtual card stack.

Furthermore, the image collection module 256 can present to the first user a set of one or more collections of images (or other multimedia objects/media content) that have been shared. The one or more collections of images can have been shared by at least one of the first user or a social connection of the first user. As such, the set of collections can be shared by the first user and/or shared to (i.e., shared with) the first user by another user. In some instances, the image collection module 256 can present the one or more collections via at least one of a feed view or a gallery view. The one or more collections, presented via the at least one of the feed view or the gallery view, can be sorted chronologically based on time data indicating when each of the one or more collections was shared. Also, in some implementations, the virtual card stack can be presented in an interface portion that is vertically above the set of one or more collections of images, which can be presented in another interface portion that is vertically below the virtual card stack. Again, many variations are possible.

As discussed, the virtual card module 254 can cause the subset of images to be presented to the first user via the first virtual card in the topmost layer of the virtual card stack. In some cases, the media content processing module 252 can receive a user command that causes the subset of images to be shared with the second user. For example, in response to the one or more options provided, the first user can decide to proceed to share or sync the subset with the second user. The image collection module 256 can accordingly provide an animation that moves the first virtual card into the set of one or more collections of images, such as to indicate that the subset in the first virtual card has been shared. The animation can, for instance, cause the first virtual card to become a first collection of images in the set. The first collection of images can be vertically above the other collections in the set. Further, the virtual card module 254 can present a second virtual card in the topmost layer in the virtual card stack. The second virtual card can present or show another subset of images.

In some instances, each subset of images and each collection of images can be referred to as an album, a moment, a container, or an event, etc. In some embodiments, at least one of the subset of images or a particular collection of images in the set can be generated or formed based on at least one of user facial recognition, event recognition, event detection, recency, reciprocity, user clustering, location similarity, and/or topic similarity. In one example, the subset or the particular collection can be generated to include images in which a same face is recognized (e.g., a face of the second user). In another example, the subset or the particular collection can be generated to include images associated with the same event, which can be recognized or detected based on location and/or time. In a further example, the subset or the particular collection can be generated to include recent images. In another example, the subset or the particular collection can be generated to include private photos that are associated with, or similar in time and/or location to, images recently shared by a user other than the first user. In yet another example, the subset or the particular collection can be generated to include images detected based on other reciprocally shared media content. In yet a further example, the subset or the particular collection can be generated to include images detected based on one or more user clustering processes. In another example, the subset or the particular collection can be generated to include images associated with the same (or substantially similar, within an allowable locational deviation from being the same, etc.) location. In a further example, the subset or the particular collection can be generated to include images associated with the same (or substantially similar, within an allowable topical deviation from being the same, etc.) topic. It should be appreciated that many variations are possible.

Figure 3A:
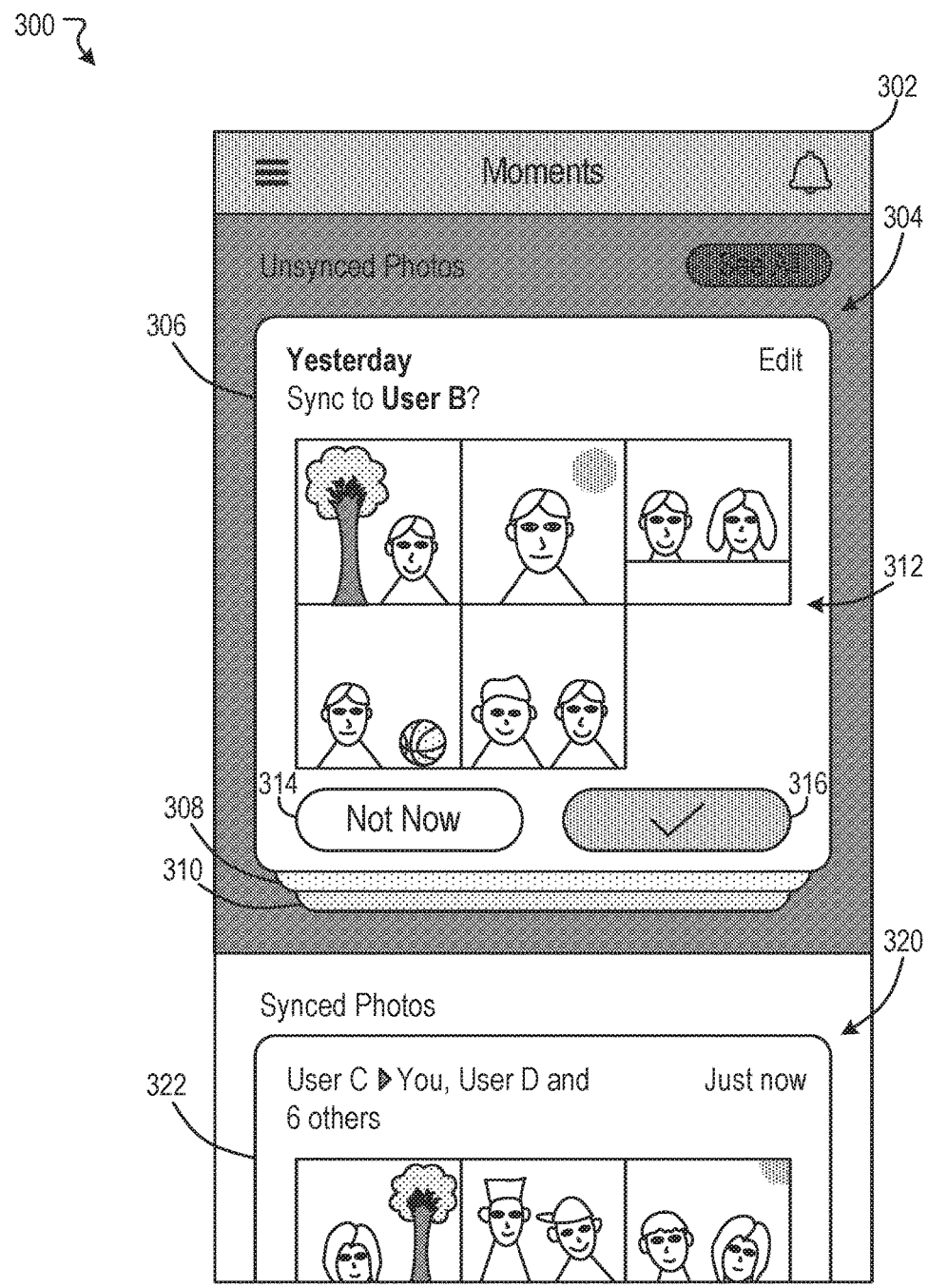
FIG. 3A illustrates an example screenshot associated with sharing media content with recognized social connections, according to an embodiment of the present disclosure.

FIG. 3A illustrates an example screenshot 300 associated with sharing media content with recognized social connections, according to an embodiment of the present disclosure. The example screenshot 300 illustrates an example interface 302, such as via a user interface of an application running on a computing system of a first user.

As shown in FIG. 3A, the example interface 302 can comprise an upper interface portion that presents unsynchronized or unshared photos. The upper interface portion can include a virtual card stack 304. In some embodiments, the virtual card stack can provide a plurality of virtual cards corresponding to a plurality of subsets of images in which one or more social connections of the first user have been recognized. The interface 302 can recommend or suggest to the first user to share each subset to one or more social connections recognized in each subset. Moreover, each subset of images can be presented by, represented by, and/or associated with a respective virtual card in the virtual card stack 304. In the example screenshot 300, a first virtual card 306, a second virtual card 308, and a third virtual card 310 can be included in the virtual card stack 304.

As shown in this example, the first virtual card 306 can present a particular subset 312 of images in which a second user, User B, has been recognized. The first virtual card 306 can provide one or more options to the first user. The one or more options can include a first option enabling the first user to edit the subset 312, a second option 314 enabling the first user to prevent (at least temporarily) the subset 312 from being shared as of now, as well as a third option 316 enabling the first user to share the subset 312 with the second user, User B.

Furthermore, the example interface 302 can also comprise a lower interface portion that presents synchronized or shared photos. The lower interface portion can include a set 320 of one or more collections of images that have been shared by the first user to one or more other users or that have been shared with the first user by one or more other users. In the example screenshot 300, the set 320 of collections of images is presented via a feed view, which can be scrollable by the first user. As shown, the set 320 includes a first collection 322 of images shared to the first user, as well as to other users, by User C. It should be understood that many variations are possible.

Figure 3B:
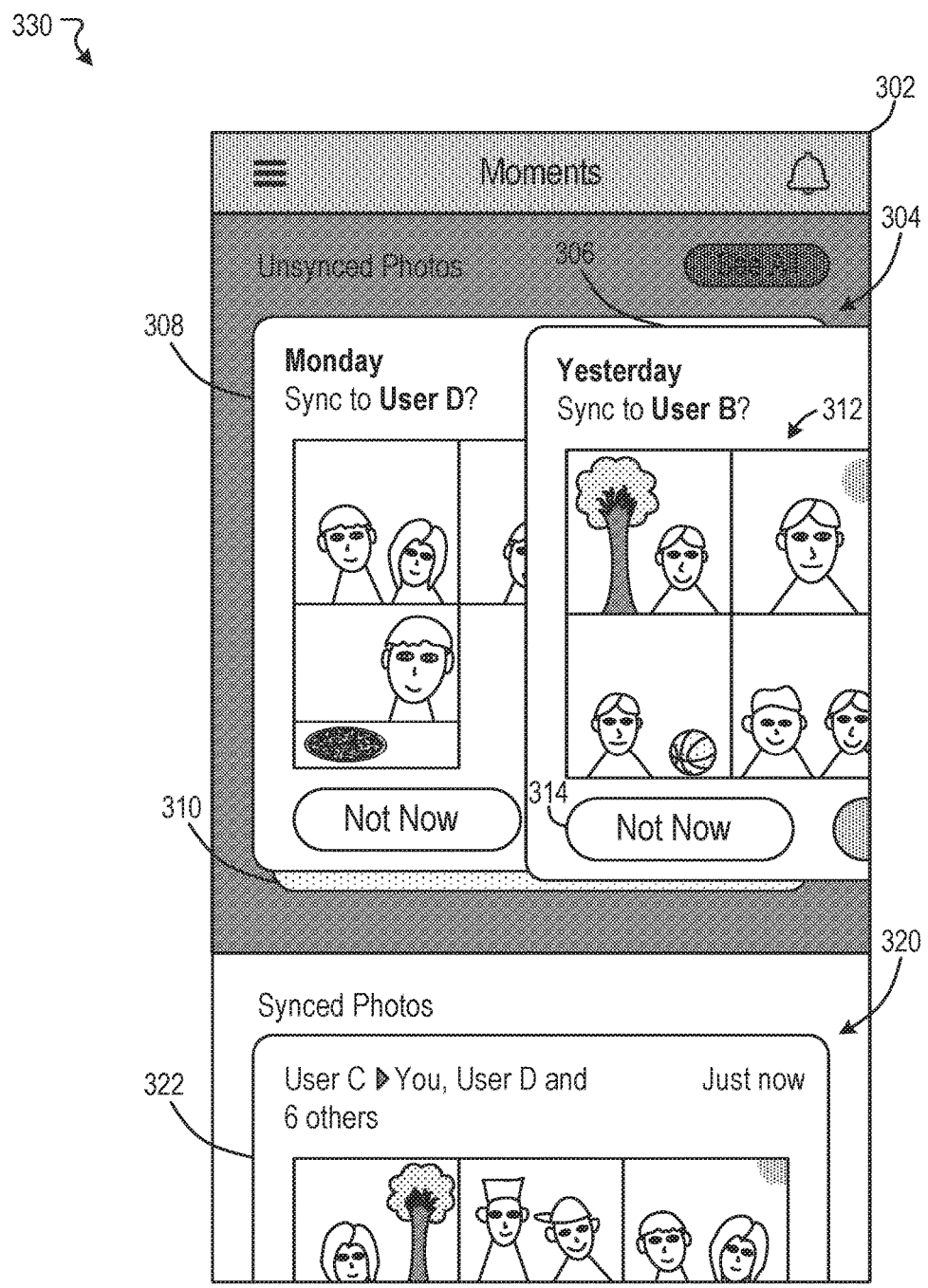
FIG. 3B illustrates an example screenshot associated with sharing media content with recognized social connections, according to an embodiment of the present disclosure.

FIG. 3B illustrates an example screenshot 330 associated with sharing media content with recognized social connections, according to an embodiment of the present disclosure. The example screenshot 330 illustrates the example interface 302 of FIG. 3A subsequent to the first user having selected the second option 314 to prevent the subset 312 from being shared to User B as of now.

As shown, when the first user has selected the second option 314 to prevent the subset 312 from being shared, the example interface 302 can provide an animation that moves the first virtual card 306 to a bottommost layer of the virtual card stack 304. The interface 302 can also present the second virtual card 308 in the topmost layer of the virtual card stack 304. The second virtual card 308 can present a second subset of images associated with User D. It should be appreciated that many variations are possible.

Figure 3C:
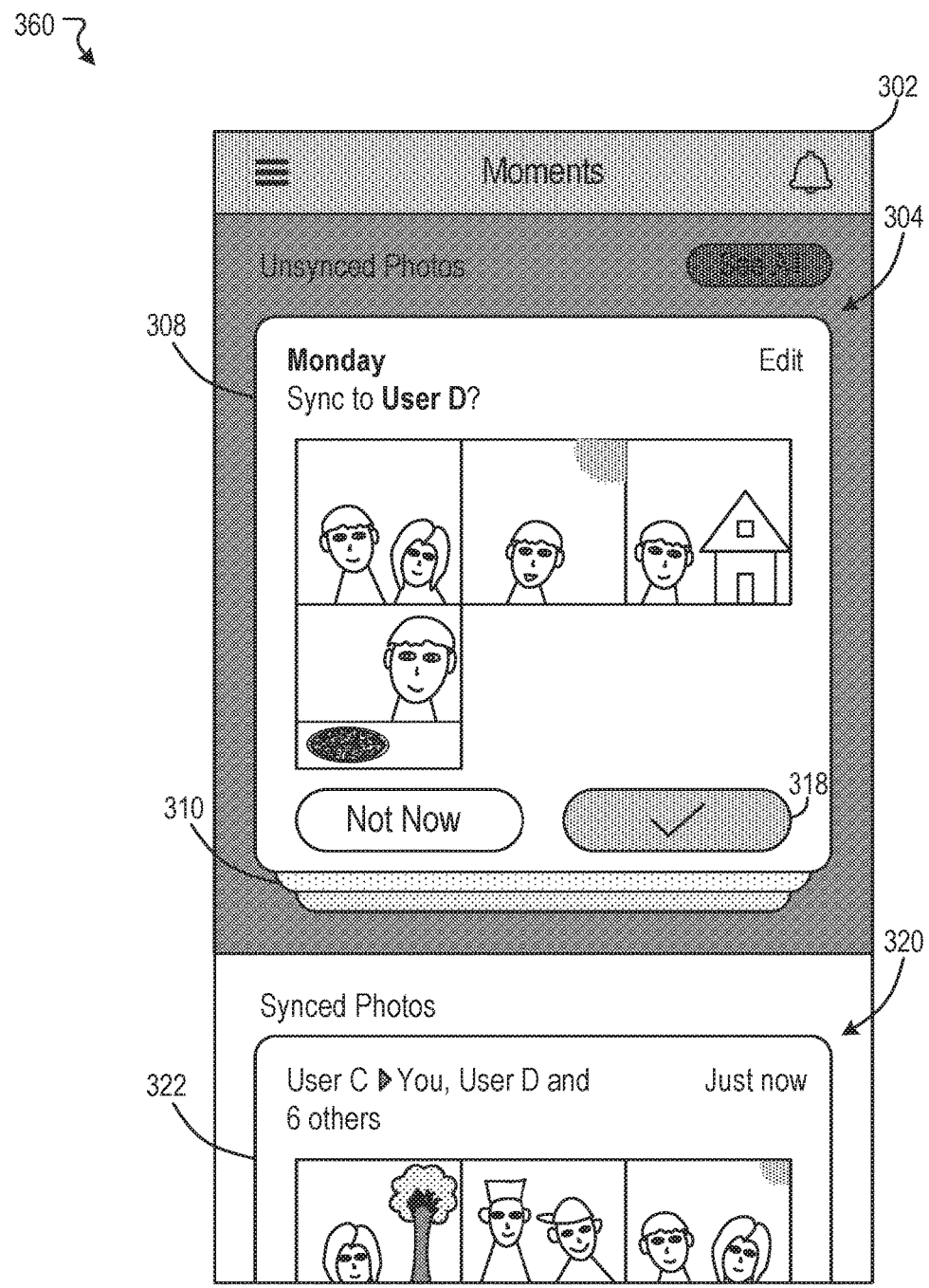
FIG. 3C illustrates an example screenshot associated with sharing media content with recognized social connections, according to an embodiment of the present disclosure.

FIG. 3C illustrates an example screenshot 360 associated with sharing media content with recognized social connections, according to an embodiment of the present disclosure. The example screenshot 360 illustrates the example interface 302 of FIG. 3B subsequent to the first virtual card having been moved to the bottommost layer of the virtual card stack 304. As shown, the second virtual card 308 is presented in the topmost layer of the virtual card stack 304.

In this example screenshot 360, if an option 318 to proceed with sharing the second subset of images with User D is selected, then the example interface 302 can provide an animation that moves the second virtual card 308 into the set 320 of the one or more collections of images. The animation can cause the second virtual card 308 to take the position of the first collection 322 of images in the interface 302 and can cause the second virtual card 308 to become a new first collection of images in the set 320. Furthermore, the interface 302 can present the third virtual card 310 in the topmost layer in the virtual card stack 304, and a third subset of images can be presented via the third virtual card 310.

Again, many variations are possible. For instance, in some embodiments, one or more additional options can be provided, such as when the first user interacts with the upper left menu icon, the upper right bell icon, and/or swipes right across the interface 302 to show additional features.

Figure 4:
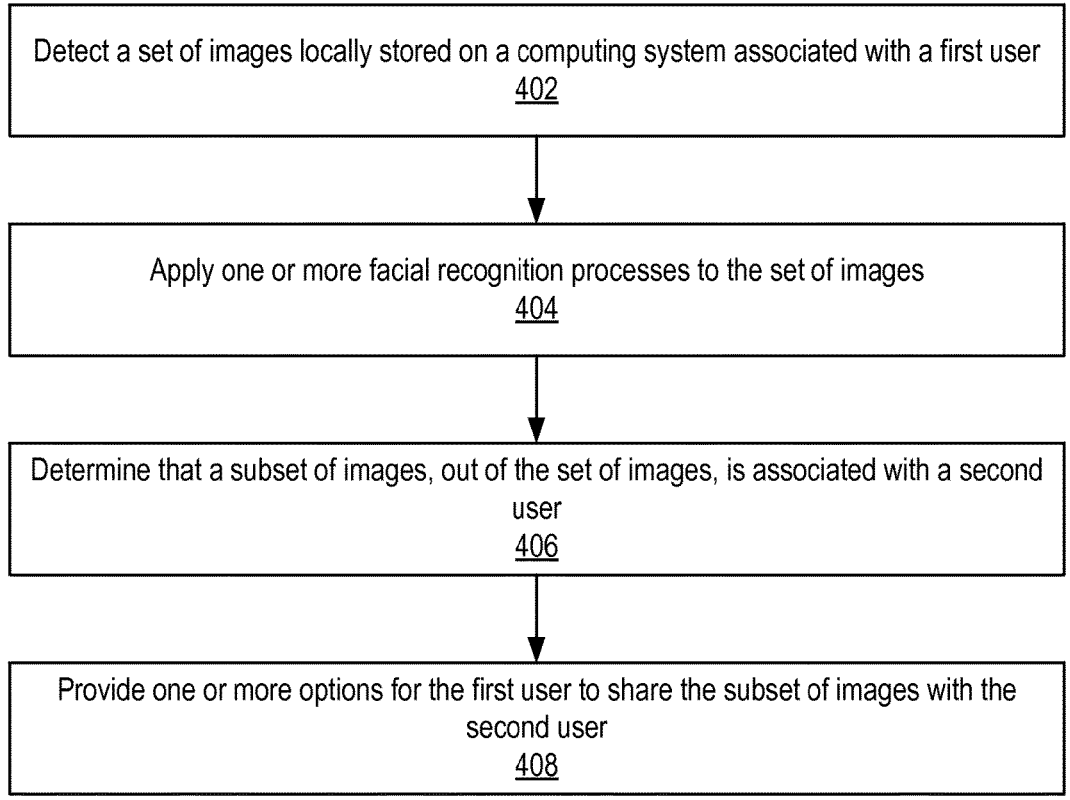
FIG. 4 illustrates an example method associated with sharing media content with recognized social connections, according to an embodiment of the present disclosure.

FIG. 4 illustrates an example method 400 associated with sharing media content with recognized social connections, according to an embodiment of the present disclosure. It should be appreciated that there can be additional, fewer, or alternative steps performed in similar or alternative orders, or in parallel, within the scope of the various embodiments unless otherwise stated.

At block 402, the example method 400 can detect a set of images locally stored on a computing system associated with a first user. At block 404, the example method 400 can apply one or more facial recognition processes to the set of images. In some embodiments, the one or more facial recognition processes can be performed at the computing system associated with the first user. In some embodiments, one or more facial detection processes can be performed at the computing system to detect one or more face portions in the images. The one or more face portions can be transmitted to one or more remote servers where the one or more facial recognition processes are applied to the one or more face portions (instead of entire images). A more detail discussion of this approach is described in U.S. patent application Ser. No. 14/656,276, filed Mar. 12, 2015, entitled "Systems And Methods For Providing Object Recognition Based On Detecting And Extracting Media Portions", which is hereby incorporated by reference in its entirety. In some embodiments, the set of (entire) images are transmitted to the one or more remote servers where the one or more facial recognition processes are applied to the set of images. At block 406, the example method 400 can determine that a subset of images, out of the set of images, is associated with a second user. At block 408, the example method 400 can provide one or more options for the first user to share the subset of images with the second user. As discussed previously, in some embodiments, the subset of images can include all images depicting the second user that are stored at the computing system associated with the first user. In some embodiments, images that are acquired, captured, or taken within an allowable deviation from a particular point in time and/or from a particular location can be added to the subset and/or can be included in another subset of images shareable with the second user.

Figure 5:
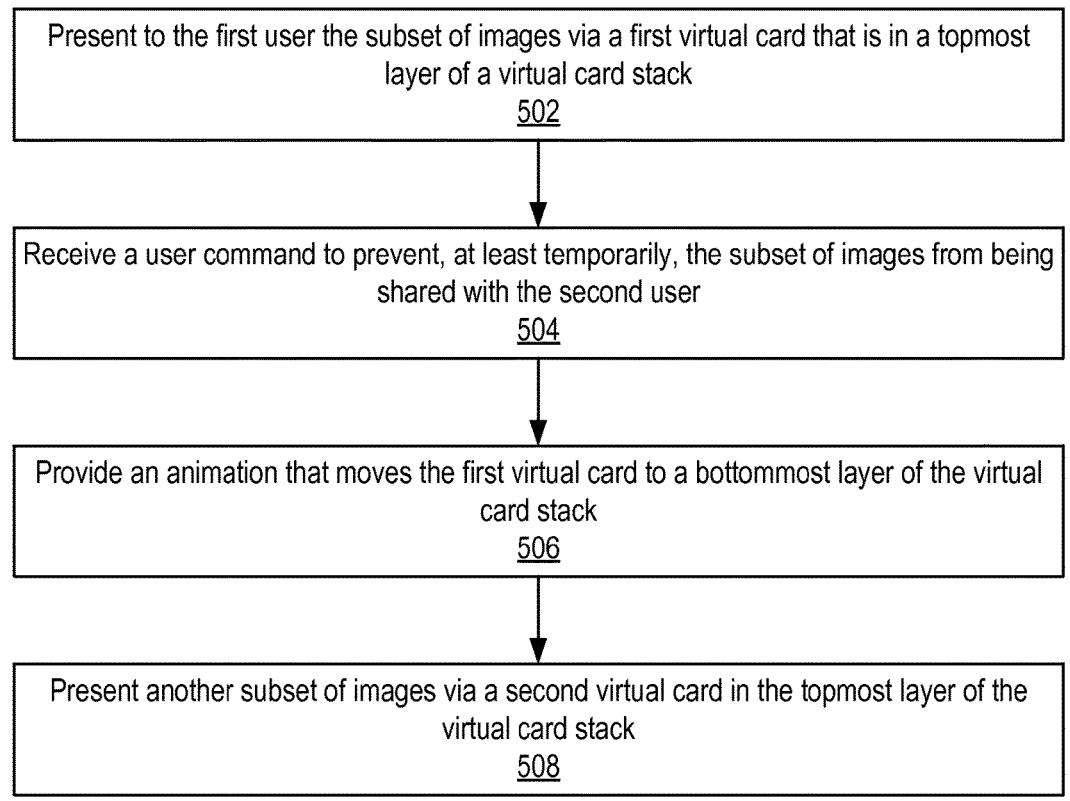
FIG. 5 illustrates an example method associated with sharing media content with recognized social connections, according to an embodiment of the present disclosure.

FIG. 5 illustrates an example method 500 associated with sharing media content with recognized social connections, according to an embodiment of the present disclosure. As discussed above, it should be appreciated that there can be additional, fewer, or alternative steps performed in similar or alternative orders, or in parallel, within the scope of the various embodiments unless otherwise stated.

At block 502, the example method 500 can present to the first user the subset of images via a first virtual card that is in a topmost layer of a virtual card stack. At block 504, the example method 500 can receive a user command to prevent, at least temporarily, the subset of images from being shared with the second user. At block 506, the example method 500 can provide an animation that moves the first virtual card to a bottommost layer of the virtual card stack. At block 508, the example method 500 can present another subset of images via a second virtual card in the topmost layer of the virtual card stack.

Figure 6:
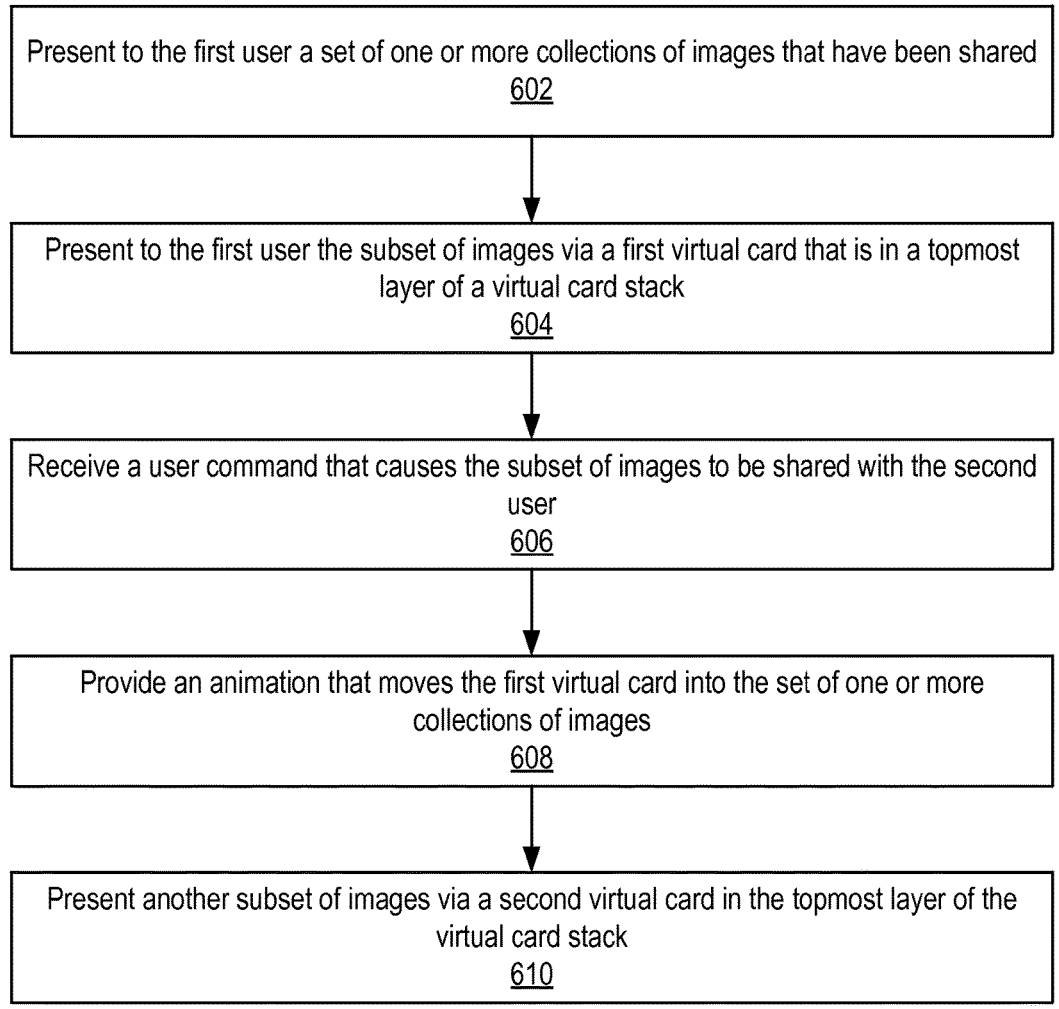
FIG. 6 illustrates an example method associated with sharing media content with recognized social connections, according to an embodiment of the present disclosure.

FIG. 6 illustrates an example method 600 associated with sharing media content with recognized social connections, according to an embodiment of the present disclosure. Again, it should be appreciated that there can be additional, fewer, or alternative steps performed in similar or alternative orders, or in parallel, within the scope of the various embodiments unless otherwise stated.

At block 602, the example method 600 can present to the first user a set of one or more collections of images that have been shared. At block 604, the example method 600 can present to the first user the subset of images via a first virtual card that is in a topmost layer of a virtual card stack. At block 606, the example method 600 can receive a user command that causes the subset of images to be shared with the second user. At block 608, the example method 600 can provide an animation that moves the first virtual card into the set of one or more collections of images. At block 610, the example method 600 can present another subset of images via a second virtual card in the topmost layer of the virtual card stack. In some cases, the collections of images can include images stored at the computing system of the first user that were acquired within an allowable time deviation and/or an allowable locational proximity from other images already shared with the second user (and/or with one or more other users). It can be suggested to the first user to add images to one or more of the collections of images. In some cases, the collections of images can include images that have been shared with the first user and it can be suggested to the first user to input or identify one or more other users recognized in one or more of the collections of images.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time. In a further example, one or more object recognition processes can be applied to images to recognize one or more objects (e.g., characters, text, addresses, emails, phone numbers, products, items, logos, marks, landmarks, buildings, scenery, animals, entities, vehicles, vessels, etc.). In some cases, identifiers, labels, tags, links, and/or categories for recognized objects can be provided in association with various embodiments of the present disclosure. In some instances, images can be sorted and/or searched, such as within a camera roll or an image album of the computing system, based on identities of recognized faces of users and/or recognized objects. Again, there can be many other variations and/or possibilities.

Social Networking System—Example Implementation

Figure 7:
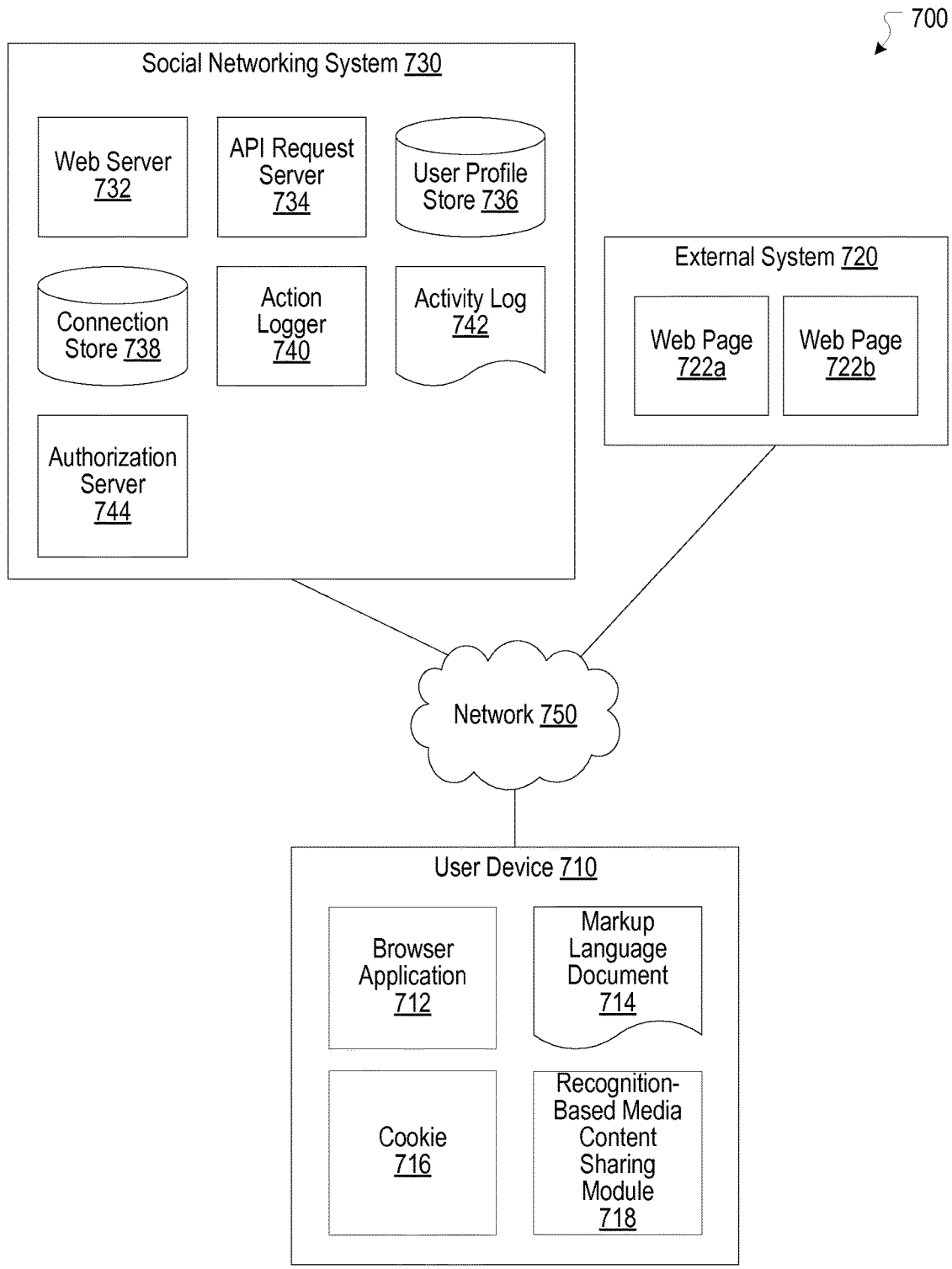
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the user device 710 can include a recognition-based media content sharing module 718. The recognition-based media content sharing module 718 can, for example, be implemented as the recognition-based media content sharing module 102 of FIG. 1. As discussed previously, it should be appreciated that there can be many variations or other possibilities. For example, in some instances, the recognition-based media content sharing module 718 (or at least a portion thereof) can be included in the social networking system 730. Other features of the recognition-based media content sharing module 718 are discussed herein in connection with the recognition-based media content sharing module 102.

Hardware Implementation

Figure 8:
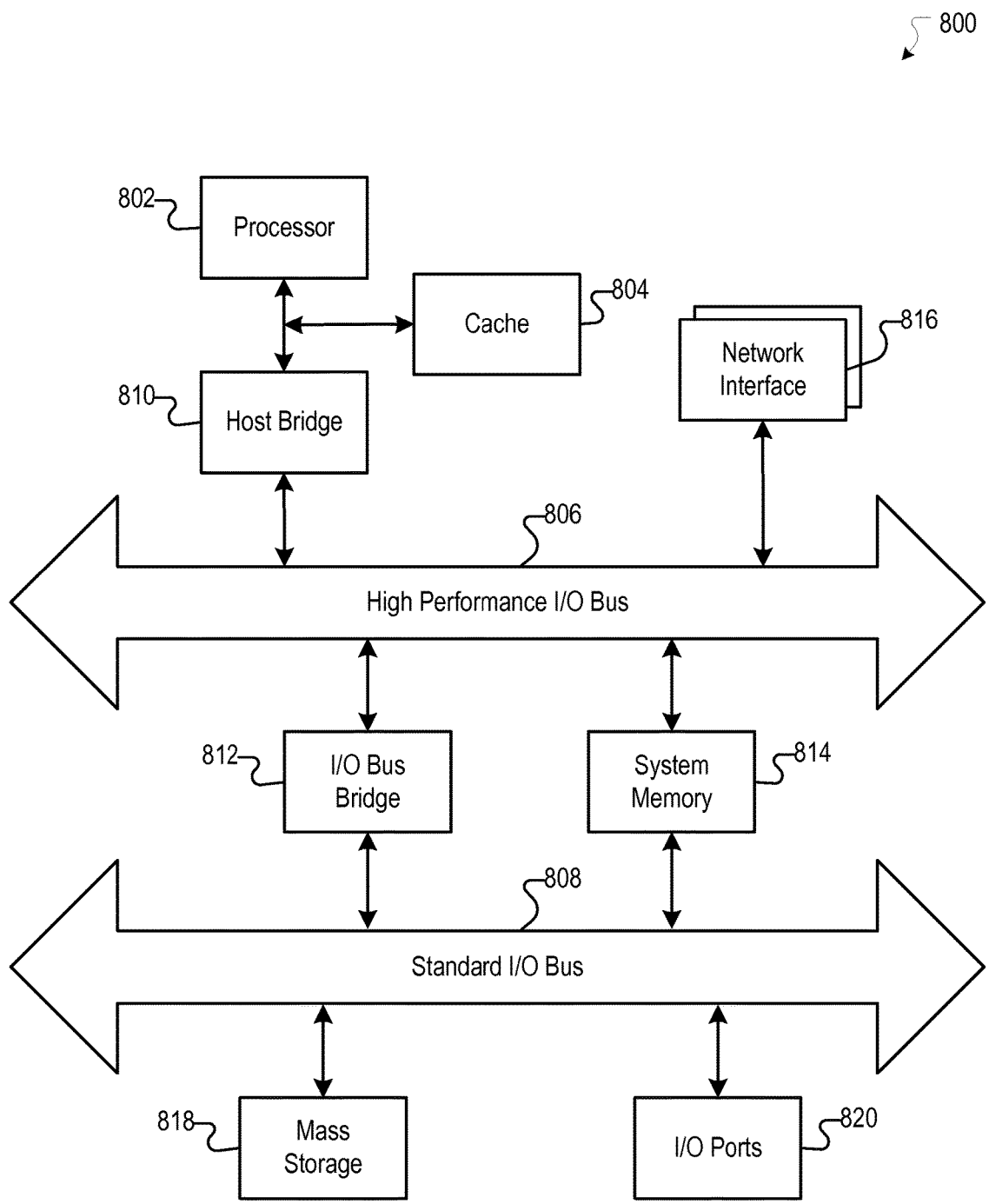
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    detecting, by a computing system, a set of images locally stored on the computing system, the computing system being associated with a first user;
    applying, by the computing system, one or more facial recognition processes to the set of images;
    determining, by the computing system, based on the one or more facial recognition processes, that a subset of images, out of the set of images, is associated with a second user;
    ranking, by the computing system, a first virtual card associated with the subset of images in relation to a second virtual card associated with a second subset of images based on social affinities between the first user and the subset of images and between the first user and the second subset of images, the second subset of images associated with a third user;
    presenting, by the computing system, to the first user the subset of images associated with the second user in the first virtual card at a position layer in a virtual card stack in relation to the second virtual card in the virtual card stack based on the ranking; and
    providing, by the computing system, one or more options for the first user to share the subset of images with the second user.

2. The computer-implemented method of claim 1, further comprising:
    presenting to the first user the first virtual card in a topmost layer of the virtual card stack;
    receiving a user command to prevent, at least temporarily, the subset of images from being shared with the second user;
    providing an animation that moves the first virtual card to a bottommost layer of the virtual card stack; and
    presenting the second virtual card in the topmost layer of the virtual card stack, wherein the second subset of images is presented via the second virtual card.

3. The computer-implemented method of claim 2, wherein the virtual card stack comprises a plurality of virtual cards including the first virtual card and the second virtual card, wherein each virtual card in the plurality of virtual cards is ranked based on a metric based on a quantity of images in which users are recognized and at least one of relevancy data, recognition quality data, historical data, location data, or time data, wherein each virtual card in the plurality of virtual cards is associated with a respective ranking, wherein each virtual card in the plurality of virtual cards is associated with a respective layer in the virtual card stack based on its respective ranking, and wherein the first virtual card is ranked higher than the second virtual card prior to receiving the user command.

4. The computer-implemented method of claim 1, further comprising:
    presenting to the first user a set of one or more collections of images that have been shared, wherein the one or more collections of images have been shared by at least one of the first user or a social connection of the first user, and wherein the one or more collections are presented via at least one of a feed view or a gallery view.

5. The computer-implemented method of claim 4, further comprising:
    presenting to the first user, in a virtual card stack, the subset of images determined to be associated with the second user, wherein the subset of images is presented via the first virtual card that is in a topmost layer of the virtual card stack;
    receiving a user command that causes the subset of images to be shared with the second user;
    providing an animation that moves the first virtual card into the set of one or more collections of images, wherein the animation causes the first virtual card to become a first collection of images in the set; and
    presenting the second virtual card in the topmost layer in the virtual card stack, wherein the second subset of images is presented via the second virtual card.

6. The computer-implemented method of claim 4, wherein the one or more collections, presented via the at least one of the feed view or the gallery view, are sorted chronologically based on time data indicating when each of the one or more collections was shared.

7. The computer-implemented method of claim 4, wherein a user command is received from the first user, and wherein the subset of images is stored privately and locally prior to receiving the user command that causes the subset of images to be shared with the second user.

8. The computer-implemented method of claim 4, wherein at least one of the subset of images or a particular collection of images in the set is generated based on at least one of user facial recognition, event recognition, event detection, recency, reciprocity, user clustering, location, or topic.

9. The computer-implemented method of claim 1, further comprising:
    determining, based on one or more user clustering processes, that another subset of images, out of the set of images, is associated with a third user, wherein an identity of the third user is yet to be determined;
    receiving, at a subsequent time, information indicating the identity of the third user; and
    associating the other subset of images with the third user.

10. The computer-implemented method of claim 1, further comprising:
    determining that information associated with a face template of the second user is permitted to be transmitted to the computing system; and receiving the face template of the second user, wherein the one or more facial recognition processes utilize, at least in part, the face template associated with the second user.

11. A system comprising:
at least one processor; and
a memory storing instructions that, when executed by the at least one processor, cause the system to perform:
   detecting a set of images locally stored on the system, the system being associated with a first user;
   applying one or more facial recognition processes to the set of images;
   determining, based on the one or more facial recognition processes, that a subset of images, out of the set of images, is associated with a second user;
   ranking a first virtual card associated with the subset of images in relation to a second virtual card associated with a second subset of images based on social affinities between the first user and the subset of images and between the first user and the second subset of images, the second subset of images associated with a third user;
   presenting, by the system, to the first user the subset of images associated with the second user in the first virtual card at a position layer in a virtual card stack in relation to the second virtual card in the virtual card stack based on the ranking; and
   providing one or more options for the first user to share the subset of images with the second user.

12. The system of claim 11, wherein the instructions cause the system to further perform:
   presenting to the first user the first virtual card in a topmost layer of the virtual card stack;
   receiving a user command to prevent, at least temporarily, the subset of images from being shared with the second user;
   providing an animation that moves the first virtual card to a bottommost layer of the virtual card stack; and
   presenting the second virtual card in the topmost layer of the virtual card stack, wherein the second subset of images is presented via the second virtual card.

13. The system of claim 12, wherein the virtual card stack comprises a plurality of virtual cards including the first virtual card and the second virtual card, wherein each virtual card in the plurality of virtual cards is ranked based on a metric based on a quantity of images in which users are recognized and at least one of relevancy data, recognition quality data, historical data, location data, or time data, wherein each virtual card in the plurality of virtual cards is associated with a respective ranking, wherein each virtual card in the plurality of virtual cards is associated with a respective layer in the virtual card stack based on its respective ranking, and wherein the first virtual card is ranked higher than the second virtual card prior to receiving the user command.

14. The system of claim 11, wherein the instructions cause the system to further perform:
   presenting to the first user a set of one or more collections of images that have been shared, wherein the one or more collections of images have been shared by at least one of the first user or a social connection of the first user, and wherein the one or more collections are presented via at least one of a feed view or a gallery view.

15. The system of claim 14, wherein the instructions cause the system to further perform:
   presenting to the first user, in a virtual card stack, the subset of images determined to be associated with the second user, wherein the subset of images is presented via the first virtual card that is in a topmost layer of the virtual card stack;
   receiving a user command that causes the subset of images to be shared with the second user;
   providing an animation that moves the first virtual card into the set of one or more collections of images, wherein the animation causes the first virtual card to become a first collection of images in the set; and
   presenting the second virtual card in the topmost layer in the virtual card stack, wherein the second subset of images is presented via the second virtual card.

16. A non-transitory computer-readable storage medium including instructions that, when executed by at least one processor of a computing system, cause the computing system to perform:
   detecting a set of images locally stored on the computing system, the computing system being associated with a first user;
   applying one or more facial recognition processes to the set of images;
   determining, based on the one or more facial recognition processes, that a subset of images, out of the set of images, is associated with a second user;
   ranking a first virtual card associated with the subset of images in relation to a second virtual card associated with a second subset of images based on social affinities between the first user and the subset of images and between the first user and the second subset of images, the second subset of images associated with a third user;
   presenting, by the computing system, to the first user the subset of images associated with the second user in the first virtual card at a position layer in a virtual card stack in relation to the second virtual card in the virtual card stack based on the ranking; and
   providing one or more options for the first user to share the subset of images with the second user.

17. The non-transitory computer-readable storage medium of claim 16, wherein the instructions cause the system to further perform:
   presenting to the first user the first virtual card that is in a topmost layer of the virtual card stack;
   receiving a user command to prevent, at least temporarily, the subset of images from being shared with the second user;
   providing an animation that moves the first virtual card to a bottommost layer of the virtual card stack; and
   presenting the second virtual card in the topmost layer of the virtual card stack, wherein the second subset of images is presented via the second virtual card.

18. The non-transitory computer-readable storage medium of claim 17, wherein the virtual card stack comprises a plurality of virtual cards including the first virtual card and the second virtual card, wherein each virtual card in the plurality of virtual cards is ranked based on a metric based on a quantity of images in which users are recognized and at least one of relevancy data, recognition quality data, historical data, location data, or time data, wherein each virtual card in the plurality of virtual cards is associated with a respective ranking, wherein each virtual card in the plurality of virtual cards is associated with a respective layer in the virtual card stack based on its respective ranking, and wherein the first virtual card is ranked higher than the second virtual card prior to receiving the user command.

19. The non-transitory computer-readable storage medium of claim 16, wherein the instructions cause the system to further perform:
- presenting to the first user a set of one or more collections of images that have been shared, wherein the one or more collections of images have been shared by at least one of the first user or a social connection of the first user, and wherein the one or more collections are presented via at least one of a feed view or a gallery view.

20. The non-transitory computer-readable storage medium of claim 19, wherein the instructions cause the system to further perform:
- presenting to the first user, in a virtual card stack, the subset of images determined to be associated with the second user, wherein the subset of images is presented via the first virtual card that is in a topmost layer of the virtual card stack;
- receiving a user command that causes the subset of images to be shared with the second user;
- providing an animation that moves the first virtual card into the set of one or more collections of images, wherein the animation causes the first virtual card to become a first collection of images in the set; and
- presenting the second virtual card in the topmost layer in the virtual card stack, wherein the second subset of images is presented via the second virtual card.

* * * * *